United States Patent [19]

Wise

[11] 3,743,910
[45] July 3, 1973

[54] TRACING FEED RATE CONTROL CIRCUIT
[75] Inventor: Robert G. Wise, Loveland, Ohio
[73] Assignee: Cincinnati Milacron Inc., Cincinnati, Ohio
[22] Filed: Aug. 20, 1971
[21] Appl. No.: 173,417

[52] U.S. Cl.................. 318/578, 318/616, 318/571
[51] Int. Cl. ........................................... G05b 19/36
[58] Field of Search................... 318/576, 577, 578, 318/616, 571

[56] References Cited
UNITED STATES PATENTS
2,623,943  12/1952  Adler............................. 318/576 X
3,609,322  9/1971  Burnett et al................... 318/578 X
2,583,535  1/1952  Adler............................. 318/576 X Primary Examiner—T. E. Lynch
Attorney—Howard T. Keiser et al.

[57] ABSTRACT

An improved electronic tracing control including a tracing feed rate control circuit for modifying the tracing velocity in response to internal corners in a model. When the tracing apparatus enters an internal corner, the control circuit immediately attenuates the tracing feed rate in response to an instantaneous change in the quadrature error signal. The tracing feed rate is then gradually increased as the tracing control changes direction through the corner.

5 Claims, 3 Drawing Figures

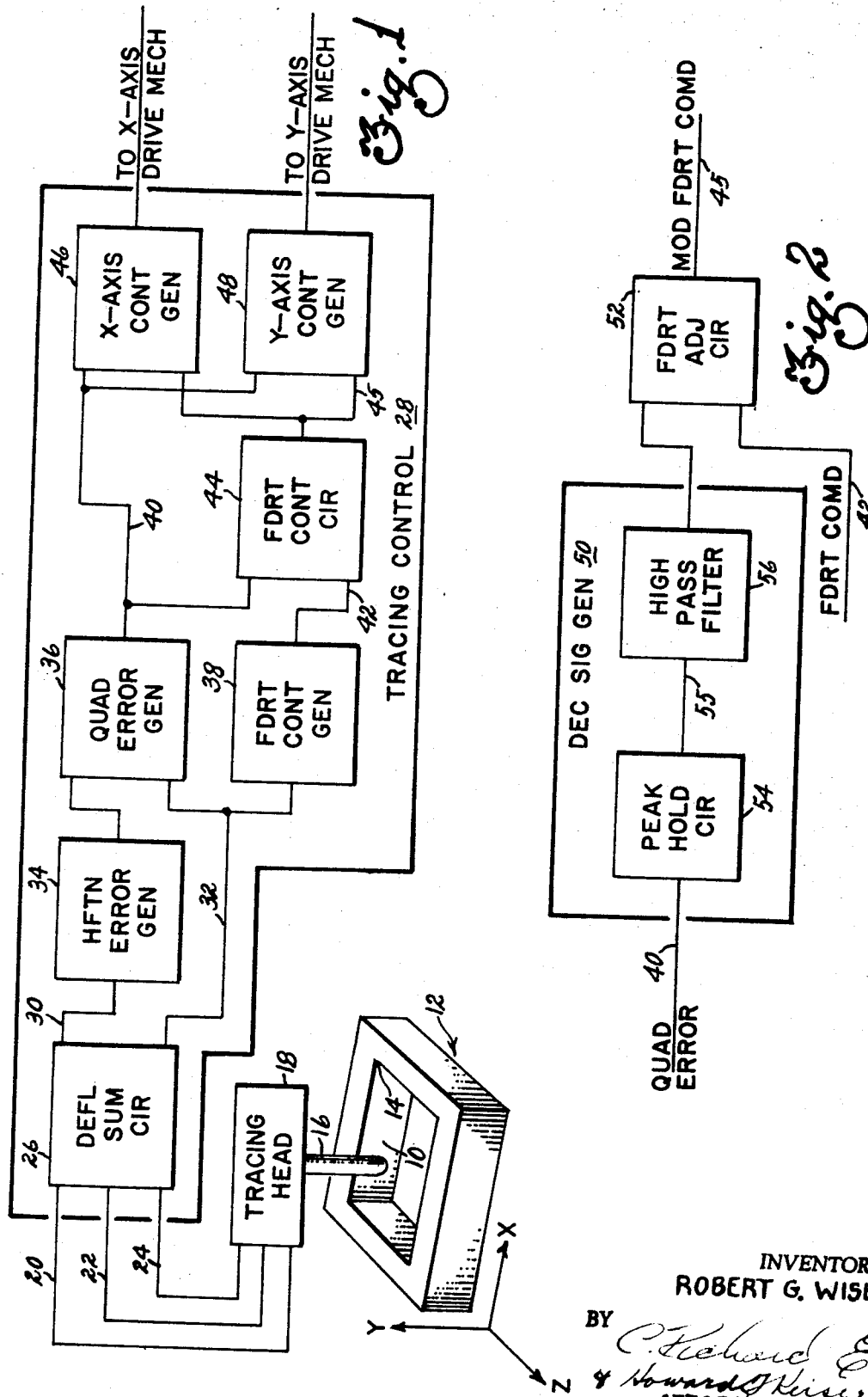

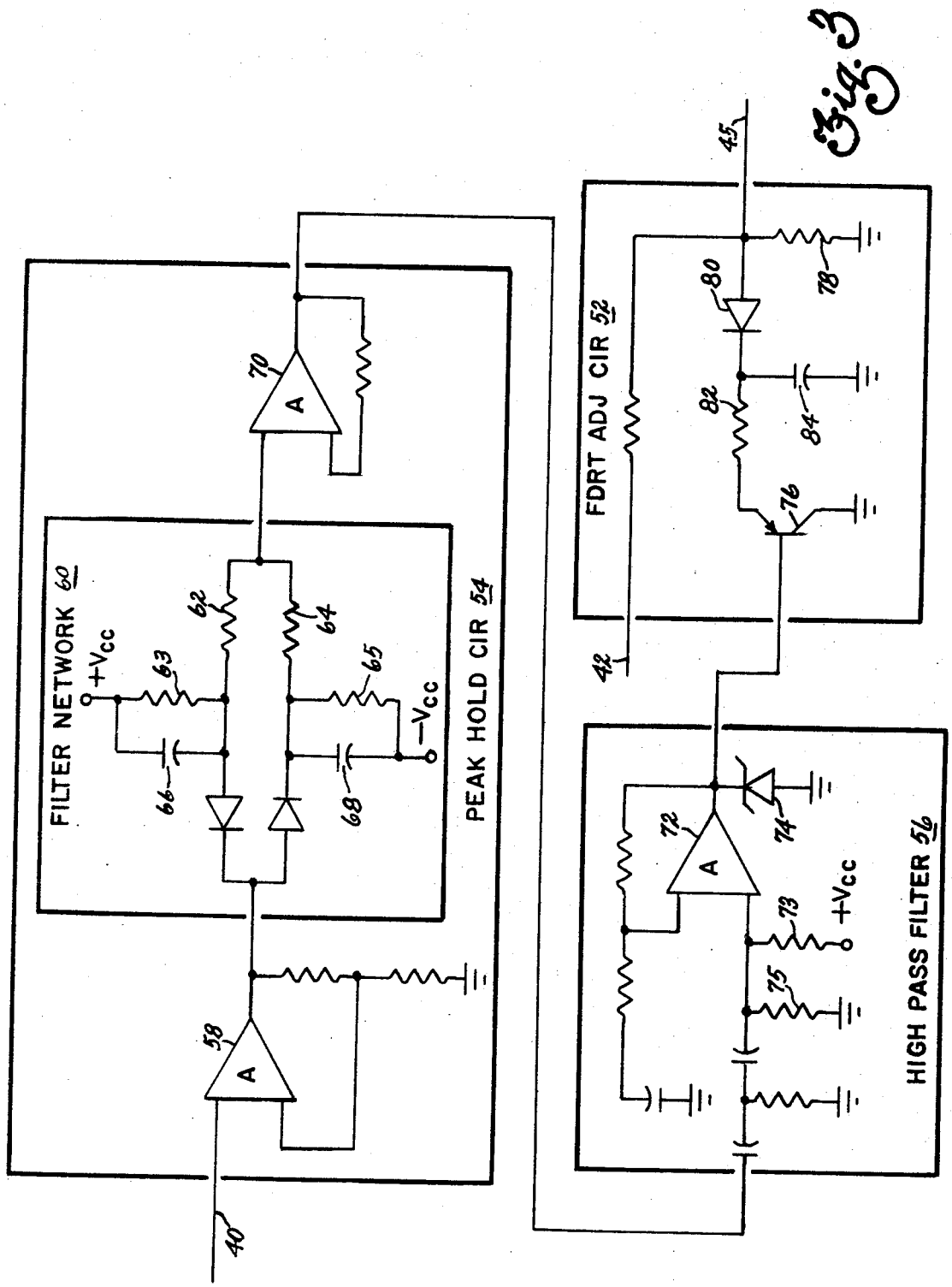

TRACING FEED RATE CONTROL CIRCUIT

BACKGROUND OF THE INVENTION

The invention relates generally to the area of tracing controls, and specifically, the invention provides an automatic feed rate control for tracing through internal corners in a model.

The invention is for use in a tracing system comprised of a machine with a plurality of movable elements and a tracing head having a tracing finger in contact with a model. Transducers in the tracing head produce deflection signals to a tracing control. The tracing control produces the appropriate drive signals to driving mechanisms on the machine for moving the machine slides and thus the tracing finger around the model. The general construction and theory of operation of tracing controls are well-known in the art, and a comprehensive detailed description of any particular control will not aid the disclosure of the present invention.

Generally, the tracing finger follows a cross-section of the model within a predetermined tracing plane. For simplicity, the tracing plane will be defined parallel to one of the orthogonal coordinate planes of the machine. Further, the tracing finger will be assumed to only experience deflections within the tracing plane. Tracing heads are generally constructed with transducers producing deflection signals coinciding with the coordinate axes of the machine. The deflection signals are received by the tracing control and combined to produce a tracing error signal. The tracing error signal can also be considered to be composed of two vectors within the tracing plane and existing at the point of contact of the tracing finger on the model, i.e., the tracing point. The first vector or feed rate vector is tangent to the model surface at the tracing point and has a magnitude representing a predetermined value of velocity. The second vector or quadrature vector is perpendicular to the model surface at the tracing point and has a magnitude representing an error in the position of the tracing finger relative to the model. In other words, the quadrature error is responsible for maintaining the tracing finger in constant contact with the model; and therefore, the quadrature error defines the accuracy of the tracing process. The tracing control must respond to the deflection signal from the tracing head and produce drive signals to the tracing machine which maintain the tangential velocity of the tracing finger at a predetermined constant value while holding the deflection of the tracing finger at a predetermined value, i.e., the hang free to null position.

Generally, for relatively rapid tracing feed rates, e.g., 50 inches per minute, the time response of the tracing system is sufficient to maintain the tangential feed rate substantially constant and the quadrature error substantially zero. However, when one is tracing internal contours in a model, and these contours contain abrupt changes in direction, e.g., internal corners, the time response of the tracing system proves inadequate. In other words, at the rapid tracing feed rates, the tracing system is unable to change the direction of the feed rate through the corner without exceeding a predetermined tracing tolerance. Thus, any part which is machined from the tracing process will contain excessive errors. The traditional solution has been to reduce the predetermined value of tracing velocity. Typically, the velocity is reduced to approximately one-half its previous value. This solution has the disadvantage of substantially increasing the time required to trace the model; and consequently, the efficiency of the whole tracing process is reduced.

Applicant discloses an improved tracing control for automatically controlling the tracing feed rate through an internal corner of a model thereby permitting a substantial increase in the tracing velocity without excessive errors.

SUMMARY OF THE INVENTION

An improved electronic tracing control comprised in part of an apparatus for producing a quadrature error signal and a feed rate command signal. Means are provided which are responsive to the quadrature error signal for producing a control signal in response to an instantaneous overdeflection of the tracing finger. The improved tracing control includes means which are responsive to the feed rate command signal and the control signal for modifying the feed rate command signal as a function of the control signal.

BRIEF DESCRIPTION OF THE DRAWINGS

FIG. 1 is a general block diagram of a typical tracing control containing the invention.

FIG. 2 is a block diagram illustrating the basic elements of the invention.

FIG. 3 is a detailed schematic diagram of the basic components in the invention.

DESCRIPTION OF THE PREFERRED EMBODIMENT

FIG. 1 is a general block diagram of a typical tracing control including the invention. The general functions as described by the blocks in FIG. 1 are common to many tracing controls, e.g., see U.S. Pat. No. 3,609,322 issued to L.A. Burnett et al. on Sept. 28, 1971 and assigned to the same assignee as the present application. An internal contour 10 of a model 12, containing a number of internal corners, typically shown at 14, is being traced by a tracing finger 16. The tracing finger 16 is part of a tracing head 18 which is mounted on a machine (not shown) in a standard manner. The tracing head 18 contains transducers (not shown) producing X-axis, Y-axis and Z axis deflection signals on the output lines 20, 22 and 24, respectively. A deflection summing circuit 26 contained in the tracing control 28 produces a total deflection signal on an output line 30 and a tracing plane deflection signal on an output line 32. A hang free to null adjustment circuit 34 modifies the total deflection signal by a hang free to null bias signal to produce a total tracing error signal. This causes the tracing control to null out or stabilize the tracing finger in a deflected position which is displaced from the mechanical null position. Consequently, the tracing head can distinguish between overdeflection and underdeflection. The hang free to null adjustment is well-known in the art. A quadrature error generator 36 is responsive to the tracing error signal to produce, on output line 40, a quadrature error signal representing a tracing error in the tracing plane perpendicular to the surface of the model 12 at the tracing point. In other words, this signal represents a quadrature vector defining the distance and direction the tracing finger is displaced from the hang free to null position. A feed rate command generator 38 produces, on output line 42, a feed rate command signal representing a velocity in the tracing plane tangent to the surface of the model 12 at the tracing point. This signal represents a feed rate vector defining the direction and magnitude of the commanded velocity. A feed rate control circuit 44 is responsive to the quadrature error signal and the feed rate command signal. Upon sensing an abrupt change of direction in an internal contour on the model, the circuit 44 is operative to change the feed rate command signal according to a predetermined deceleration characteristic. The modified feed rate command signal on line 45 and the quadrature error signal are input to X-axis and Y-axis control generators 46 and 48, respectively. The control generators reduce the input signals to the appropriate coordinate axis components and produce drive signals from the tracing control 28 to the correpsonding driving mechanisms for moving the machine in a manner causing the tracing finger 16 to accurately trace along the internal contour 10 of the model 12.

FIG. 2 is a block diagram of the feed rate control circuit shown in FIG. 1. The quadrature error signal on line 40 is an input to a deceleration signal generator 50. The generator 50 produces a control signal in response to an overdeflection of the tracing finger as it enters an internal corner. The control signal and the feed rate command signal on line 42 are inputs to a feed rate adjust circuit 52. The circuit 52 modifies the feed rate command signal as a function of the control signal.

It should be noted that as the tracing system steers through the internal corner, the control signal is operative to decrease and then subsequently increase the feed rate signal. Consequently, the machine not only experiences a deceleration but also an acceleration. Therefore, for purposes of this disclosure, the term deceleration refers generally to the second time derivative of distance and does not imply a particular sense of velocity change. Obviously, an acceleration is nothing more than a negative deceleration.

The deceleration signal generator is comprised of a peak hold circuit 54 and a high pass filter 56. The circuit 54 produces a first signal on an output line 55 in response to a non-cyclic rapid increase in the magnitude of the quadrature error signal. The peak hold circuit also operates to filter out any low frequency noise signals. If the machine is simultaneously cutting a workpiece in response to the tracing process, a relatively low frequency noise will be introduced into the quadrature error signal. This noise originates in the machining process as the cutting elements on the tool contact the workpiece. This cyclic contact creates a vibration which is fed back through the machine structure to the tracing head. The transducers in the tracing head will respond to the vibration and introduce low frequency cyclic noise into the quadrature error signal. Further, the tracking of the tracing finger over a rough model surface may also introduce low frequency noise into the quadrature error signal. The peak hold circuit 54 is operative to filter out a substantial portion of these noise signals.

The first signal on output line 55 is an input to a second order high pass filter 56. The filter 56 produces a control signal having a wave form which approximates the second derivitive with respect to time of the input. Since the input signal is a function of deflection or a distance error, the filter output will represent a corresponding deceleration error. When plotted against time, a characteristic curve of the control signal will define the time rate of change of the feed rate command signal in the feed rate adjust circuit 52.

Generally, when the tracing finger enters an internal corner, the immediate overdeflection will cause an instantaneous change in the control signal to some predetermined level, and the feed rate adjust circuit reduces the feed rate command signal to some minimum value. As the tracing control steers through the corner and the first signal from the peak hold circuit decays, the control signal from the high pass filter also changes; and the feedrate adjust circuit increases the magnitude of the feed rate command signal to its original predetermined value. Since the dynamics of the machine and the resonse of the tracing system will vary from system to system, the minimum feed rate and the rate of recovery of the feed rate will vary with each tracing system. It should be remembered that the initial overdeflection greatly exceeds the hang free to null position, therefore, the magnitude of the hang free to null value is inversely proportional to the period of time required for correction. Hence, the magnitude of the hang free to null value also effects the characteristic of the control signal. The high pass filter may be tuned to produce a control signal representing a deceleration characteristic which matches a particular tracing system thereby optimizing the control of the feed rate command signal.

FIG. 3 is a detailed schematic diagram of the feed rate control circuit. The peak hold circuit 54 has an input buffer amplifier 58 which is responsive to the quadrature error signal on the line 40. An output of the amplifier 58 is connected as an input to a filter network 60. The filter network 60 produces an output in response to non-cyclic rapid increase in the input. The output then decays back to its original state according to the appropriate time constants defined by the resistors 62, 63, 64 and 65 and capacitors 66 and 68. The output of the filter is an input to an amplifier 70 which operates to match the impedance between the output of the filter 60 and the second order high pass filter 56. The filter 56 is comprised of an amplifier 72 which is AC coupled to the output of the amplifier 70. With no input to the high pass filter 56, a voltage divider circuit comprised of resistors 73 and 75 produces a bias signal on the input of amplifier 72 which holds its output at a positive level close to the breakdown voltage of zener diode 74. Consequently, transistor 76 in the feed rate adjustment circuit 52 is held in its non-conducting state, and the feed rate command signal on the line 42 passes through the feed rate adjustment circuit to the output line 45 with no change.

When the tracing finger experiences a substantial overdeflection upon encountering an abrupt change in direction on the model contour, the first signal from the peak hold circuit 54 rises sharply to a peak value; and the control signal from the high pass filter 56 decreases sharply at a substantially greater rate. This change in the control signal drives the transistor 76 into conduction, and a substantial portion of the feed rate signal on line 42 is shunted to ground through the diode 80, resistor 82, and transistor 76. The conduction path through transistor 76 also permits capacitor 84 to discharge. With only a minimum potential drop across the resistor 78, the modified feed rate signal on the output line 45 causes the velocity of the tracing finger to be rapidly and substantially reduced. As the first signal from the peak hold circuit 54 slowly decays from its peak value, the control signal from the high pass filter 56 increases to its original value at a substantially greater rate; and transistor 76 is switched to its non-conducting state. This initiates a change on the capacitor 84 and increases, on the output line 45, the magnitude of the modified feed rate signal which then returns to its original magnitude at a rate dependent on the charging time constant of the capacitor 84.

While the invention has been illustrated in some detail according to the preferred embodiments shown in the accompanying drawings and while the preferred illustrated embodiments have been described in some detail, there is no intention to thus limit the invention to such details. On the contrary, it is intended to cover all modifications, alterations, and equivalents falling within the spirit and scope of the appended claims.

What is claimed is:

1. An automatic tracing apparatus comprised in part of a tracing head including a tracing finger for tracking a three-dimensional model and a tracing control producing therein an error signal representing an erroneous deflection within a tracing plane in a direction perpendicular to a model surface at a tracing point, and a feed rate command signal having a magnitude representing a predetermined tracing velocity within the tracing plane tangent to the model surface at the tracing point, wherein the improvement comprises:
   a. means responsive to the error signal for producing a control signal as a function of an overdeflection of the tracing finger being caused by said tracing finger encountering a change in direction of an internal contour of the model, said control signal representing a deceleration characteristic; and
   b. means responsive to the control signal and the feed rate command signal for modifying the feed rate command signal as a function of the deceleration characteristic of the control signal whereby the magnitude of said feed rate command signal decreases and subsequently increases gradually to its original magnitude.

2. An automatic tracing apparatus comprised in part of a tracing head including a tracing finger for tracking a three-dimensional model and a tracing control producing therein an error signal representing an erroneous deflection in a tracing plane in a direction perpendicular to a model surface at a tracing point and a feed rate command signal having a magnitude representing a predetermined tracing velocity in the tracing plane tangent to the model surface at the tracing point, wherein the improvement comprises:
   a. means responsive to the error signal for producing a first signal in response to an overdeflection of the tracing finger defining a rapid non-cyclic increase in the error signal;
   b. means responsive to the first signal for producing a control signal as a function of the second derivative of the rapid non-cyclic increase in the error signal; and
   c. means responsive to the control signal and the feed rate command signal for modifying the feed rate command signal whereby the magnitude of said feed rate command signal decreases and subsequently increases as a function of the second derivative of the rapid non-cyclic increase in the error signal.

3. An automatic tracing apparatus comprised in part of a tracing head including a tracing finger for tracking a three-dimensional model and a tracing control producing therein an error signal representing an erroneous deflection in a tracing plane in a direction perpendicular to a model surface at a tracing point and a feed rate command signal having a magnitude representing a predetermined tracing velocity in the tracing plane tangent to the model surface at the tracing point, wherein the improvement comprises:
   a. a peakhold circuit responsive to the error signal and producing a first output signal in response to an over-deflection of the tracing finger;
   b. a second order high pass filter connected to the peakhold circuit and producing a control signal; and
   c. a feed rate adjustment circuit connected to the second order high pass filter and responsive to the feed rate command signal for modifying the feed rate command signal as a function of the control signal whereby said feed rate command signal is immediately reduced in response to an overdeflection of the tracing finger and gradually increases to its predetermined value.

4. The apparatus of claim 3 wherein the peak hold circuit comprises:
   a. a buffer amplifier having the quadrature error signal as an input; and
   b. a filter network having an input connected to the buffer amplifier and producing an output signal in response to a rapid increase in the magnitude of the quadrature error signal.

5. The apparatus of claim 4 wherein the peak hold circuit further comprises and impedance matching amplifier connected to the filter network and producing the first output signal in response to the output signal.

* * * * *